Oct. 6, 1953  H. W. GILLETT  2,654,821
HOT MACHINING OF METALS
Filed July 15, 1948

INVENTOR.
HORACE W. GILLETT
BY Hudson, Boughton,
Williams, David & Hoffmann
ATTORNEYS

UNITED STATES PATENT OFFICE 2,654,821

HOT MACHINING OF METALS

Horace W. Gillett, Columbus, Ohio, assignor, by mesne assignments, to The Warner & Swasey Company, Cleveland, Ohio, a corporation of Ohio Application July 15, 1948, Serial No. 38,835

4 Claims. (Cl. 219—1)

This invention relates to machining of metals and more particularly to an apparatus for machining metals at elevated temperatures.

Many alloys in use at the present time, such as those employed in gas turbines or the like, are extremely difficult or practically impossible to machine at room temperatures. In addition, there are a number of other alloys which may be machined at room temperatures but which it is desirable to machine at much faster rates than now possible or with greater tool life at the same rates. Extended experimentation has revealed that machining of these various types of alloys is rendered possible and/or greatly facilitated by heating them prior to engagement of a metal removing tool therewith.

The principal object of this invention is, therefore, the provision of an improved method for heating metallic workpieces and for machining the latter while hot, thereby facilitating the machining operation and rendering practical the machining of metals which are difficult or impossible to machine at room temperatures.

Another object of the invention is the provision of an improved method for machining metals which comprises rapidly heating the surface of that portion of the workpiece which is to be removed to a temperature sufficient to materially reduce its hardness, discontinuing the heating of that portion of the workpiece and allowing it to retain its heat for a period of time sufficient to cause penetration of the heat therein thereby reducing the hardness of the metal to a predetermined depth, and then employing a material removing tool to effect removal of the heated metal to a predetermined depth which is substantially equal to the depth to which the hardness has been materially reduced by the penetration of the heat.

A further object of the invention is the provision of an improved method for machining a metallic workpiece which comprises rotating the workpiece, establishing an electric arc between an electrode and the surface of the workpiece so that succeeding contiguous limited areas thereof are rapidly heated sufficiently to materially reduce the hardness thereof, and then engaging a material removing tool with the heated portions of the workpiece a predetermined time after each of said limited areas thereof has passed beneath the electrode, the time interval being determined from the nature of the material being machined, the speed of rotation thereof and the electric power applied to the arc and being sufficient to allow penetration of the heat to the depth necessary to materially reduce the hardness of the material throughout the depth of the portion removed by the tool.

The invention further resides in certain novel steps of procedure, and further objects and advantages thereof will be apparent to those skilled in the art to which it pertains from the following description of the present preferred embodiment thereof, described with reference to the accompanying drawing in which similar reference characters represent corresponding parts in the several views and in which.

Figure 1:
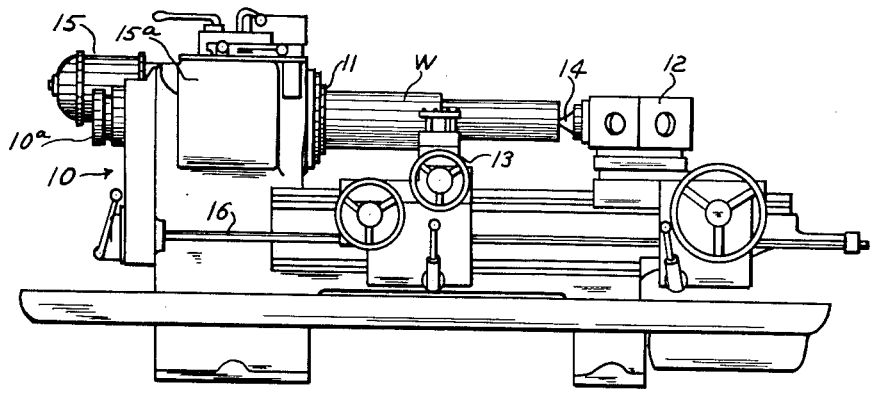
Fig. 1 is a front elevational view of a machine tool of the turret lathe type which may be employed for machining in accordance with this invention.

In accordance with the procedure of this invention the surface of that portion of a workpiece which is to be removed by a material removing tool is rapidly heated to a temperature sufficient to materally reduce its hardness. The heating of that portion is then discontinued and the heated portion is then allowed to retain its heat for a relatively short period of time which is, however, sufficient to cause the heat which was applied to the surface to penetrate into the workpiece a distance sufficient to reduce the hardness of the material to a predetermined depth. A material removing tool is then engaged with the heated portion of the workpiece and effects removal of the heated material to a depth which is substantially equal to the depth to which the hardness thereof has been materially reduced by the penetration of the heat. Consequently, the principal part of the heat which is supplied to the workpiece is carried away in the chip removed by the material removing tool so that the majority of the heat thus employed is effective for assisting the material removing operation by lessening the hardness of the machined portion of the workpiece and very little of the heat is lost by elevating the internal temperature of the workpiece.

This procedure may be advantageously performed by supporting the workpiece in a conventional machine tool such as a turret lathe or the like and employing a heating means which produces a rapid and intense heating of a limited area of the workpiece in advance of the engagement of that area with the material removing tool of the lathe or the like. The means for applying the heat to the workpiece is spaced about the periphery of the workpiece in advance of the material removing tool a predetermined distance which is selected in accordance with the nature and size of the material being machined, the speed of rotation thereof, the depth of cut and the quantity of heat supplied by the heating means. Consequently, as the workpiece is rotated, successive contiguous limited areas of the surface thereof are rapidly heated to a high temperature as they pass beneath the heating means and, during the time that the workpiece rotates the additional distance to bring the heated portions thereof into machining engagement with the material removing tool, the heat thus applied to the surface penetrates into the workpiece a distance such that the hardness of the layer of material removed by the tool is reduced sufficiently so that the tool removes a chip of desired characteristics.

The tool is so set that the thickness of the chip removed includes substantially all of the material whose hardness has been appreciably reduced by the heating so that the majority of the heat supplied to the workpiece is carried away in the chip and only a small percentage thereof penetrates into the interior of the workpiece to raise the temperature of the interior thereof. As a result the portion of the workpiece remaining after machining has not been heated sufficiently to adversely affect its hardness or its crystalline characteristics. The heat retaining time, that is, the interval from the time a given limited area of the workpiece passes beneath the heating means until it is engaged by the material removing tool, allows the heat to penetrate sufficiently to elevate the temperature of the surface layer the amount necessary for ease in machining throughout the depth of the cut. This heat retaining time period for a given speed of rotation of the workpiece and a given feeding movement of the tool can be readily calculated from the relationship between the lathe speed in revolutions per minute and the feed in inches per revolution. The lathe speed governs the cutting speed of the tool in inches per minute and the distance that the heating means leads the tool can be adjusted to provide the necessary heat retaining time.

An apparatus for effecting the above described method is illustrated in the drawing as comprising a conventional machine tool, generally designated 10, which, for purpose of illustration, is shown as being a conventional turret lathe. Such a machine tool comprises a work spindle 10a provided with a work gripping chuck 11, a turret 12 and a cross slide 13. As will be seen in Fig. 1, the workpiece W, of considerable length, is supported at one end by the chuck 11 while the other end of the workpiece is engaged by a center 14 carried by the turret 12. The workpiece is rotated by a motor 15 and the conventional mechanism provided in the head 15a of the machine tool and the cross slide 13 is actuated in timed relationship therewith by means of the usual drive train connecting the work spindle 10a and the feed shaft 16. The cross slide 13 is provided with a tool support 17 for mounting a material removing tool 18 for cooperation with the workpiece W.

Figure 2:
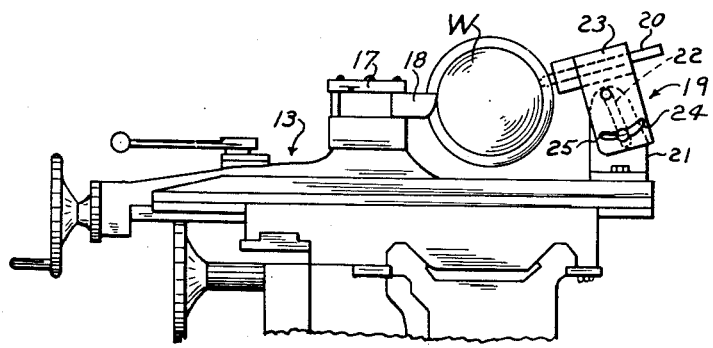
Fig. 2 is a fragmentary end view of the machine tool illustrated in Fig. 1, as seen from the right-hand end of that figure, the turret and certain other parts of the machine tool being removed for the sake of clarity and to show an electrical arc electrode for effecting heating of the workpiece.
Figure 3:
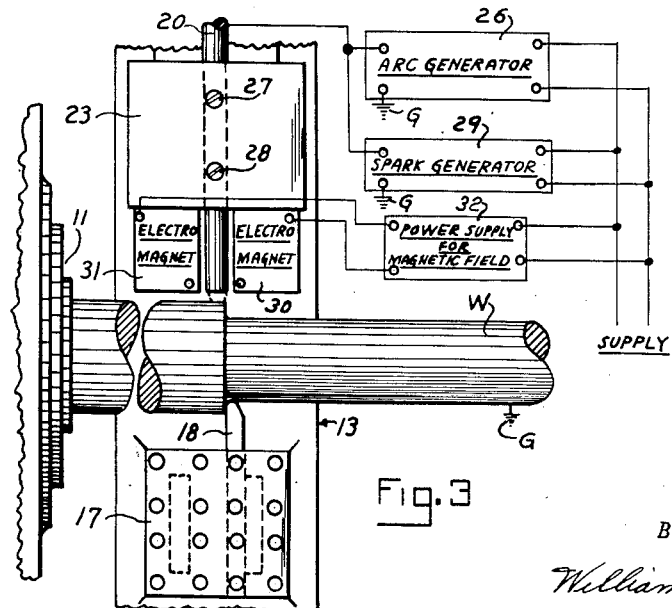
Fig. 3 is a fragmentary top plan view of a portion of the structure shown in Fig. 2, the apparatus for producing and maintaining the electrical arc for heating successive limited areas of the workpiece being schematically represented; and, Fig. 4 is an enlarged fragmentary view, partly in section and partly in elevation, showing the manner in which the electrical arc heats the workpiece.

As shown in Figs. 2 and 3, the tool support 17 is mounted upon the tool slide 13 in front of the workpiece and the rear of the tool slide is provided with an adjustable support, generally designated 19, for an electrical arc electrode 20. The adjustable support 19 may be constructed in any suitable manner for adjustably supporting the electrode 20 both towards and away from the workpiece W and angularly thereabout. For the purpose of illustration, this support 19 has been shown as comprising a bracket 21 which is bolted to the tool slide 13, the upper portion of this bracket being preferably provided with an angular slot 22. The electrode 20 is supported in a member 23 which has two spaced, downwardly extending portions straddling the upwardly extending portion of the bracket 21. These downwardly extending portions of the member 23 are preferably provided with aligned arcuate slots 24. The member 23 is secured to the bracket 21, in a predetermined angular position, by a bolt, or the like, 25 which passes through the slots 22 and 24 for clamping the member 23 to the bracket 21.

The electrode 20 may be mounted in the member 23 by any suitable means but is here shown as extending through a bore in that member, being held therein by a pair of set screws, or the like, 27, 28. The electrode 20 is electrically connected with one terminal of a suitable arc generator 26, the other terminal of which is electrically connected with the workpiece W to be machined. This may be effected in a variety of different ways as, for example, by providing a slip ring on a portion of the workpiece for cooperation with the stationary brush or, as shown, by simply connecting the arc generator 26 to the frame of the machine tool, this being indicated by grounds G to which the generator 26 and the workpiece W are shown connected.

The support 19 for the electrode is so adjusted that the arc produced between the electrode and the workpiece is a predetermined distance in advance of the tool 18, this adjustment being effected by virtue of movement of bolt 25 within the slots 22 and 24, the amount of this separation determining the previously mentioned heat retaining time. The separation between the end of the electrode 20 and the workpiece W is then adjusted to produce an arc of the desired length, this adjustment being effected by rocking of the member 23 towards or away from the work W as necessary and/or by loosening the set screws 27 and 28 and moving the electrode 20 relative to the member 23 after which the set screws may again be tightened.

The arc generator 26 may be either of the D. C. or A. C. type since either form of current has been found satisfactory when employed with the auxiliary arc controlling devices hereinafter described. With either type of current it has been found that an arc of desired length tends to be extinguished by rotation of the workpiece W due to the constant introduction into the arc of cool material of the workpiece. In order to overcome this quenching tendency and to maintain the arc at all times, a high frequency alternating potential of relatively high value is superimposed upon the arc producing current. This may be advantageously accomplished, as shown in Fig. 3, by providing a spark generator 29 one terminal of which is grounded and the other terminal of which is connected to the electrode 20 so that the high frequency sparking potential is applied between the electrode and the work W. By employing this expedient any tendency of the arc to be extinguished is counteracted by the sparking potential maintained between the work and the electrode so that the arc is not quenched during normal operation of the apparatus.

For efficient operation it is essential that the width of the arc be maintained at a substantially constant and relatively small value so that relatively intense heating of successively limited areas of the workpiece is effected as the latter rotates beneath the electrode and which areas are to be substantially immediately removed by the tool 18. In order to confine the arc and prevent wandering thereof a magnetic field is maintained transverse of the arc. In the present preferred embodiment this is effected by employing two electromagnets 30 and 31 disposed on opposite sides of the electrode adjacent the forward end of the latter so that the magnetic field produced thereby is transverse of the arc. These electromagnets may be either of the direct or alternating current type and are shown as supplied by electrical current from a power supply 32. If desired, however, a separate power supply need not be employed since the electromagnets may be connected with the arc generator and employ a portion of the current therefrom.

Figure 4:
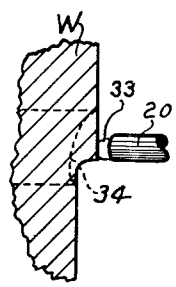

When employing the apparatus just described to machine a relatively long workpiece in accordance with the method of this invention the workpiece W is supported in the machine tool by the chuck 11 and the tail center 14. A suitable tool 18 is then mounted upon the support 17, the work is rotated, the arc generator, spark generator and power supply for the magnetic field are energized and feeding movement is imparted to the tool slide 13. Consequently, a confined electrical arc is established between the electrode 20 and the surface of the workpiece so that succeeding, contiguous, limited areas of the latter are rapidly raised to a high temperature as they rotate beneath the arc. During the period of time that the workpiece further rotates to bring the heated areas of the work into engagement with the tool 18, the heat supplied by the arc will have penetrated into the work sufficiently to materially reduce the hardness of the latter to the desired depth of cut. This condition is indicated in Fig. 4 wherein reference numeral 33 indicates the arc between the electrode 20 and the surface of the workpiece W, the curved broken line 34 indicating the manner in which the heat supplied by the arc penetrates into the workpiece. Since the electrode 20 is mounted upon the tool slide 13, the electrode is moved longitudinally of the work along with the cutting tool 18 so that the electric arc is always positioned to heat those areas of the work which are to be substantially immediately thereafter removed by the tool 18. The separation between the tool and the electrode 20 is adjusted to provide the necessary period of time for the heat to penetrate the surface of the work the desired depth into the workpiece, this period of time being ordinarily in the order of a few seconds. The proper value of this separation is determined from the specific power input, the thermal constant of the material, the diameter of the work, the revolutions per minute thereof and the depth of cut, the specific power input being determined by dividing the arc power by the product of the circumference of the work and the width of the arc.

When the workpiece has a relatively large diameter, for example, 4 inches or greater, it is frequently desirable to employ more than one electrode to provide the necessary heating. This is because the necessary arc power on a single electrode to properly heat such a workpiece produces undesirable vaporization of the metal and by employing a plurality of electrodes the arc power of each may be kept within reasonable limits while still producing the necessary heat input. When multiple electrodes are employed, suitable means should be provided to properly ballast the current flow for each electrode or a separate power supply should be provided for each.

When the apparatus is to be employed continuously for relatively long periods of time, for example, when machining a relatively long workpiece, means may be provided for automatically feeding the electrode 20 relative to its support 23 to provide a substantially constant length of arc. This means is not illustrated but may be any of the conventional devices employed for similar purposes in welding or similar apparatus.

The following metals may be mentioned by way of example of those which may be advantageously machined by the method and apparatus of this invention. It is to be understood, however, that the materials and/or operating conditions hereinafter mentioned are offered simply as illustrations and the invention is not limited thereto. Thus, the procedure greatly improves machining operations upon stainless steel, type 304, and alloys identified in the trade as NE 8949, Clarite, Vitallium, NR 76, NR 74 and N 155, the chemical composition of these materials being as follows:

*Chemical composition of materials expressed in percentages*

|    | Stainless Steel (Type 304) | NE 8949 | Clarite | Vitallium | NR-76 | NR-74 | N-155 |
|----|---------|---------|---------|-----------|-------|-------|-------|
| C  | 0.08 | 0.48 | 0.72 | 0.22-0.25 | 0.40 | 0.45 | 0.40 |
| Mn | 0.29 | 1.20 | 0.25 |  |  |  |  |
| Ni | 9.50 | 0.50 |  |  | 20.0 | 20.0 | 20.0 |
| Cr | 20.0 | 0.50 | 4.0 | 25.0 | 20.0 | 20.0 | 20.0 |
| Mo |  | 0.35 |  | 5.5-6.0 | 4.0 | 4.0 | 3.0 |
| Si | 0.33 | 0.27 |  |  |  |  |  |
| P  | 0.019 | 0.04 |  |  |  |  |  |
| S  | 0.009 | 0.04 |  |  |  |  |  |
| Co |  |  |  | Bal. | 45.0 | 20.0 | 20.0 |
| W  |  |  | 18.0 |  | 4.0 | 4.0 | 2.0 |
| Cb |  |  |  |  | 4.0 | 4.0 | 1.0 |
| Fe | Bal. | Bal. | Bal. |  | 6.0 | Bal. | Bal. |
| Va |  |  | 1.25 |  |  |  |  |

The stainless steel, type 304, may be machined at room temperatures but it was found that when the layer of material removed by the machining operation was heated to a temperature of 400° F., the tool life was seven times that obtained at room temperatures for the same speeds, feeds, and depth of cut, or the cutting speed could be 60% greater than that at room temperatures for the same tool life. This demonstrates the wide application of the method of this invention since it not only enables the machining of materials which it is practically impossible to machine at room temperature but also increases the speed of machining and/or tool life when operating upon materials which can be machined at room temperatures.

Conventional machining of Vitallium at room temperatures was practically impossible since the chip was powdery, and surface speeds greater than 20 feet per minute or depths of cut greater than .010 inch resulted in immediate failure of the tool upon engagement with the work. When the same type of cutting tool and the same lathe were employed and the latter was equipped with arc heating as herein disclosed having specific power inputs ranging up to 3 kilowatts per square inch, it was possible to machine this material at a surface speed rate of 40 feet per minute, and a depth of cut of .040 inch, the temperature of the layer of the material being in the order of 700° F.

Clarite, which is also practically unmachinable at room temperatures was satisfactorily machined when the surface layer thereof was raised to a temperature of 1200° F.

The steel known as NE 8949 may be machined at room temperature without difficulty but much better results and greater cutting efficiency are obtained when the material is heated in the manner herein described to a temperature of 700° F.

The alloys known as NR 74 and NR 76 can be machined at room temperatures only at very low speed with a very fine feed and a shallow depth of cut. These alloys may, however, be satisfactorily machined at much higher speeds and deeper cuts when heated in accordance with this invention.

There is an optimum specific power input rate and heat retaining time for each type and size of material, although the method may operate with lesser efficiency but still better than at room temperatures somewhat outside of these optimum values. Since these optimum values vary in accordance with the size and kind of material, no attempt is herein made to list these values which may be readily determnied in the manner stated above. By way of example, it may be noted, however, that satisfactory operation upon stainless steel, Clarite and Vitallium is obtained when the temperatures of the chips resulting from the machining are 1600° F., 1820° F., and 2400° F., respectively. The difference between the chip temperatures with and without heating approximates the surface temperature obtained by heating and therefore the proper temperatures for heating materials may be readily determined by measuring the temperatures of the chips resulting from machining, or attempting to machine, at room temperatures.

It is desirable to confine the heat which is applied to that portion of the layer which is to be substantially immediately removed by the tool since this reduces the necessary heat input and results in most of the heat being carried away in the chip thus leaving the work comparatively cool and thereby obviating likelihood of injury thereto. In general, the layer of metal to be removed is heated quickly to a relatively high temperature and then permitted to retain the heat for a brief time before reaching the cutting tool. This allows the heat to penetrate into the material so that the hardness of the layer to be removed is materially reduced substantially uniformly throughout at the depth of cut. Best results are obtained when the depth of penetration of the heat at the time the tool engages the heated portion is not greater than twice the depth of the cut. The tools employed for effecting the machining should be selected with a view to satisfactory operation at elevated temperatures. Carbide tools with low cobalt and high titanium contents are found to give a longer life than carbide tools in which the cobalt content is high, also it has been discovered that best results are obtained with a zero angle of rake. Tools of other compositions and/or angles may be employed depending upon the type of material machined and the temperatures at which the machining is effected. In general, the more difficult it is to machine the material at room temperature, the higher it must be heated for satisfactory operation.

While the apparatus has been disclosed as employing arc heating of the work it is possible to employ a flame of small cross section for at least those materials of the nature of stainless steel or the like. The flame should, however, be positioned in advance of the point of engagement of the tool with the work to provide the necessary heat retaining time for penetration of the heat to the desired depth.

Moreover, the invention is not limited to use in machining operations in which the workpiece is rotated but may also be utilized for machining operations in which the workpiece is stationary and the heating means and material removing tool are moved. For example, the invention is applicable to the machining of turbine blades or other articles. In such operations the heating means and the tool or tools are mounted for movement relative to the workpiece, by any suitable mechanism, with the heating means preceding the material removing tool so that the necessary time interval is provided between the application of heat and the engagement of the tool or tools with the work. Furthermore, the invention may be employed with machine tools, such as planers or the like, in which the work is reciprocated relative to a material removing tool, by providing a heating means, such as a flame or an electrical arc, in advance of the engagement of the tool with the work so that the tool acts only on portions of the work which have been properly heated to the depth of material removal.

All such adaptations are considered to fall within the scope of this invention and, therefore, the steps of procedure and the apparatus which have been specifically described and illustrated are to be considered simply as representative of the present preferred embodiment of the invention.

Having thus described the invention, I claim:

1. The method of machining a metallic workpiece comprising establishing an electric arc between an electrode and the surface of the workpiece to heat a limited area of the latter sufficiently to materially reduce the hardness thereof, rotating the workpiece relative to the electrode so that the arc progressively rapidly heats successive contiguous limited areas of the workpiece, and then engaging a material removing tool with the heated portions of the workpiece a predetermined time after each of said limited areas thereof has passed beneath said electrode, the said time interval being determined from the nature of the material to be machined, the speed of rotation thereof and the electric power applied to the arc and being sufficient to allow penetration of the heat to the depth necessary to materially reduce the hardness of the material throughout the depth of material removal.

2. The method as defined in claim 1 and further comprising providing a magnetic field transverse of the said electrical arc to confine said arc to a predetermined area.

3. The method as defined in claim 1 and further comprising superimposing a high frequency, high voltage, alternating potential upon the said arc to prevent quenching of the latter due to rotation of the workpiece.

4. The method of machining a metallic workpiece comprising establishing an electric arc between an electrode and the surface of the workpiece to heat a limited area of the latter sufficiently to materially reduce the hardness thereof, moving the said electrode relative to the workpiece so that the arc progressively rapidly heats successive contiguous limited areas of the workpiece, and then moving a material removing tool relative to the workpiece and in engagement with the heated portions of the workpiece a predetermined distance behind the said arc to remove the heated portions of the workpiece, the said distance being determined from the nature of the material of the workpiece, the speed of movement of the arc over the workpiece and the electric power applied to the electrode and being sufficient to allow penetration of the heat throughout the depth of material removal effected by the tool.

HORACE W. GILLETT.

References Cited in the file of this patent

UNITED STATES PATENTS

| Number | Name | Date |
|---|---|---|
| Re. 23,092 | Berliner | Mar. 22, 1949 |
| 561,367 | Badger | June 2, 1896 |
| 571,463 | Thomson | Nov. 17, 1896 |
| 837,277 | Birkeland et al. | Dec. 4, 1906 |
| 1,864,899 | Brown et al. | June 28, 1932 |
| 2,059,236 | Holslag | Nov. 3, 1936 |
| 2,284,351 | Wyer | May 26, 1942 |
| 2,330,503 | Longoria | Sept. 28, 1943 |
| 2,355,838 | Young | Aug. 15, 1944 |
| 2,513,425 | Lobosco | July 4, 1950 |

FOREIGN PATENTS

| Number | Country | Date |
|---|---|---|
| 448,078 | Germany | Aug. 3, 1927 |
| 580,877 | Great Britain | Sept. 23, 1946 |